United States Patent
Edpalm et al.

(10) Patent No.: US 10,856,002 B2
(45) Date of Patent: Dec. 1, 2020

(54) METHOD, DEVICE AND SYSTEM FOR METHOD OF ENCODING A SEQUENCE OF FRAMES IN A VIDEO STREAM

(71) Applicant: Axis AB, Lund (SE)

(72) Inventors: Viktor Edpalm, Lund (SE); Björn Ardö, Lund (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 16/361,475

(22) Filed: Mar. 22, 2019

(65) Prior Publication Data

US 2019/0306525 A1    Oct. 3, 2019

(30) Foreign Application Priority Data

Mar. 28, 2018    (EP) .................... 18164676

(51) Int. Cl.
*H04N 19/513*    (2014.01)
*H04N 19/105*    (2014.01)
*H04N 19/11*     (2014.01)
*H04N 19/184*    (2014.01)
*H04N 19/114*    (2014.01)
*H04N 19/137*    (2014.01)
*H04N 19/172*    (2014.01)

(52) U.S. Cl.
CPC ......... *H04N 19/513* (2014.11); *H04N 19/105* (2014.11); *H04N 19/11* (2014.11); *H04N 19/114* (2014.11); *H04N 19/137* (2014.11); *H04N 19/172* (2014.11); *H04N 19/184* (2014.11)

(58) Field of Classification Search
CPC .. H04N 19/513; H04N 19/114; H04N 19/137; H04N 19/172; H04N 19/105; H04N 19/11; H04N 19/184
See application file for complete search history.

(56) References Cited

U.S. PATENT DOCUMENTS

| | | |
|---|---|---|
| 2009/0147853 A1 | 6/2009 | Dane et al. |
| 2010/0245595 A1 | 9/2010 | Waehner |
| 2016/0165171 A1 | 6/2016 | Ardo et al. |

FOREIGN PATENT DOCUMENTS

| | | | |
|---|---|---|---|
| JP | 2007-324923 A | 12/2007 | |
| WO | 2005/065030 A2 | 7/2005 | |
| WO | WO-2005065030 A2 * | 7/2005 | ........... H04N 19/172 |
| WO | 2007072244 A1 | 6/2007 | |

OTHER PUBLICATIONS

Extended European Search Report dated Sep. 25, 2018 for the European Patent Application No. 18164676.1.

* cited by examiner

*Primary Examiner* — Tat C Chio
(74) *Attorney, Agent, or Firm* — Volpe Koenig (57) ABSTRACT

The present teachings relate to the field of video encoding. In particular, the present teachings relate to a method, device, and system for encoding a sequence of frames wherein a motion level of image data of an initial frame in the sequence of frames is determined to be below a motion level threshold. The encoding method described herein may reduce the bit rate for the encoded sequence of frames, while avoiding that the encoded video stream looks unnatural or frozen when decoded and displayed.

15 Claims, 4 Drawing Sheets

Fig. 6

METHOD, DEVICE AND SYSTEM FOR METHOD OF ENCODING A SEQUENCE OF FRAMES IN A VIDEO STREAM

FIELD OF INVENTION

The present teachings relate to the field of video encoding. In particular, it relates to a method, an encoder and a system for encoding a sequence of frames wherein a motion level of image data of an initial frame in the sequence of frames is determined to be below a motion level threshold.

BACKGROUND

Video cameras are commonly used for surveillance purposes. A scene monitored by a camera may during some periods of time include moving objects, thereby introducing motion in a video captured by the camera. During other periods of time the scene may only include stationary objects, thereby causing the video captured by the camera to lack motion, that is, the captured video will be a still video.

Bandwidth efficiency is often an issue when it comes to encoding video streams. Advantageously, the video stream is encoded to reduce the bit rate of the video stream but without affecting the quality of the encoded video stream in a (too) noticeable way. In order to deal with varying amount of motion in the scene in a bandwidth efficient way, the encoder may dynamically adjust the frame rate of the encoded video stream depending on the amount of motion in the scene as depicted in the frames. In other words, during periods of time when there is motion in the frames (and thus in the scene), a higher frame rate in the encoded video stream may be used compared to when there is no or little motion in the frames. For example, when there is limited or no motion in the frames, the frame rate may be as low as 1 Hz, meaning that there is only one frame per second in the encoded video stream. At such low frame rates, there will be very little temporal noise in the video. As a consequence, a user watching the decoded video will find that it looks unnatural and frozen, and the user could start wondering if there is a hardware or software malfunction of the camera.

Another way of dealing with the varying amount of motion in the scene in a bandwidth efficient way is to use encoding techniques where the level of compression applied by the encoder varies with the importance of the image contents. For example, portions of a video frame depicting moving objects may be encoded with a lower compression than portions of the video frame where no motion is present. In particular, the portions of the video frames where no motion is present may be coded using empty blocks, sometimes referred to as skip blocks or P-skip blocks. During time periods when there is no or a limited amount of motion in the scene, the frame will thus be encoded with a majority of empty blocks. As an empty block typically will be displayed as a copy of the corresponding block in the previous frame, this will also have the effect that there is very little temporal noise in the video. Thus, again, a user watching the video will find that it looks unnatural and frozen, and the user could start wondering if there is a hardware or software malfunction with the camera.

Thus, using a low frame rate in the encoded video stream, or encoding a video stream using a large number of empty blocks as explained above may introduce an artificial stillness in the video due to the absence of temporal noise. This artificial stillness is not caused by the lack of motion in the scene itself, since a video of a static scene captured at a high frame rate and encoded similarly to a video of a moving scene (thus increasing the bit rate of the encoded video) may still include temporal noise due to noise at the image sensor, but is caused by the choice of frame rate or the encoding approach used when encoding the video in a bandwidth efficient way as explained above.

There is thus a need for improvements within this context.

SUMMARY

In view of the above, it is thus an object of the present teachings to overcome or at least mitigate the problems discussed above. In particular, it is an object to provide an encoding method of a video stream with low motion in a bandwidth efficient way, where the encoded video stream does not look unnatural or frozen when decoded and displayed.

According to a first aspect of the present teachings, there is provided a method of encoding a sequence of frames in a video stream, the method comprising: determining a motion level of image data of an initial frame in the sequence of frames to be below a motion level threshold; encoding a plurality of reference frames, each reference frame of the plurality of encoded reference frames being an intra-frame encoded frame or an inter-frame encoded frame; and encoding a plurality of empty frames, wherein an empty frame comprises macroblocks encoded as skip blocks and a reference to another frame in the video stream, by, for each frame to be encoded as an empty frame: selecting an encoded reference frame among the plurality of encoded reference frames; encoding the empty frame having a direct or indirect reference to the selected reference frame; wherein for at least one pair of consecutive empty frames in the encoded sequence of frames, the selected reference frame for a first empty frame in the pair differs from the selected reference frame for a second empty frame in the pair.

The step of determining a motion level of image data of an initial frame in the sequence of frames to be below a motion level threshold may be performed in any suitable way. The motion level may be computed, for example, by comparing the image data of the initial frame in the sequence of frames with image data of a preceding frame in the video stream. In one embodiment, the motion level of the initial frame is received and compared to a motion level threshold. In another embodiment, the comparison has already been made and the outcome of the comparison is received, for example, as a Boolean (true or false).

As used herein, by "empty frame" is generally meant a frame which has been encoded using skip blocks (P-skip blocks, empty blocks, etc.) for at least some of the macroblocks (MB) of the encoded frame. In some embodiments, a majority of the MBs of the empty frame are encoded as skip blocks. In yet other embodiments, all MBs are set to/encoded as skip blocks. Moreover, an empty frame comprises a reference to another frame in the video stream. In other words, the empty frame is an inter encoded frame with at least one MB encoded as a skip block.

The present teachings are based on the realization that by carefully selecting the reference frames of the empty frames, temporally noise may be introduced to the encoded sequence of frames which reduce artificial stillness. When the motion level of image data has been determined to be below a motion level threshold, which thus makes it possible to encode the sequence of frames using the concept of empty frames in a way which reduces the bit rate (but still keeping the frame rate of the encoded stream intact), this may be achieved by first encode a plurality of reference frames in a normal (conventional) way (for example an initial I-frame and at least one following P-frame without skip blocks). The subsequent empty frames are then encoded such that a pair of consecutive empty frames in the encoded sequence of frames refers to different ones of the reference frames. The references may be direct or indirect as further explained below. In other words, for a first empty frame immediately followed by a second empty frame in the encoded sequence of frames, the reference frames for the first empty frame and the second empty frame differ. Typically, in prior art, an empty frame (e.g., skip blocks in the empty frame) refers to the immediately preceding frame in the encoded sequence frame. Consequently, an empty frame immediately followed by another empty frame in the encoded sequence of frames will refer to the same reference frame. In other words, the second empty frame will refer to the same reference as the first empty frame indirectly by referring to the first empty frame which in turn refers to the reference frame. Hence, corresponding skip blocks in the two empty frames refer to the exact same MB in the reference frame, and thus will be decoded as the exact same image data in a later decoded video stream, thereby introducing artificial stillness into the decoded video stream. However, using the inventive concept disclosed herein, the corresponding MBs in the empty frames will include temporal noise at least due to noise at the image sensor when capturing the frames in the sequence of frames which are encoded as reference frames. This so called "comfort noise" will be included in the encoded video stream without any need of determining the noise, or including "fake" noise by adjusting pixel values or the like, but instead will be the consequence of implementing the empty frames as described herein.

According to some embodiments, for each pair of consecutive empty frames in the encoded sequence of frames, the selected reference frame for a first empty frame in the pair differs from the selected reference frame for a second empty frame in the pair. Consequently, the artificial stillness may be reduced even further, since no corresponding MBs in an empty frame immediately followed by another empty frame in the sequence of encoded frames will be decoded as the exact same image data in the later decoded video stream.

According to some embodiments, for a first frame to be encoded as an empty frame, said frame being immediately subsequent to a first encoded reference frame among the plurality of reference frames in the sequence of frames, the step of selecting an encoded reference frame among the plurality of encoded reference frames comprises selecting an encoded reference frame among the plurality of encoded reference frames being different from said first encoded reference frame. In other words, in this embodiment, an empty frame may not reference a reference frame which is immediately preceding the empty frame in the sequence of frames. Advantageously, the artificial stillness may be reduced even further.

According to some embodiments, the plurality of reference frames comprises one or more inter-frame encoded frames, wherein the method further comprises the step of setting all motion vectors of the one or more inter-frame encoded frames to zero. Since the sequence of frames likely includes very low level of motion, there is a limited need of performing a block matching algorithm to search for corresponding MBs in the frame referred to by the inter-frame encoded frame, which would produce the motion vectors. Instead, the motion vector can be set to zero, which will reduce the required processing power for the encoding process and may result in that an increased QP value can be used for the inter-frame encoded frame, thus further reducing the bit rate of the encoded sequence of frames.

According to some embodiments, for at least one empty frame, the encoding of the empty frame comprises: selecting an encoded reference frame among the encoded reference frames, wherein the selected encoded reference frame already is directly referred to by another encoded empty frame; and encoding the empty frame having a reference to said another encoded empty frame.

In other words, the reference in the empty frame to a selected reference frame may be indirect, via a previously encoded empty frame which refers to the selected reference frame. Advantageously, this requires less frames to be temporary stored in the encoder, the temporary stored frames being stored to be used for referral by an inter-frame encoded frame.

According to some embodiments, an encoded empty frame has the form of an inter-frame encoded frame in which all macroblocks are set to skip blocks. Consequently, the bit rate of the encoded sequence of frames may be further reduced, since the encoded empty frame will contain no image data or motion vectors, but only a reference to the selected reference frame, from which the image data to be shown when decoding the empty frame will be taken. In other words, the empty frames are inter-frame encoded frames with no updated data.

According to some embodiments, the method further comprises the steps of prior to encoding a frame of the sequence of frames, receiving a motion level for the image data of said frame, and determining whether the motion level is below the motion level threshold; upon determining that the motion level is below the threshold motion level, encoding the frame as an empty frame; and upon determining that the motion level is above the threshold motion level, encoding the frame as an inter-frame encoded frame or an intra-frame encoded frame. In this embodiment, in case the content of the scene being captured suddenly starts moving, thus increasing the motion level of the image content of the frames in the video stream, a frame which otherwise would have been encoded as an empty frame may instead be encoded as an inter-frame encoded frame or an intra-frame encoded frame (that is without any skip blocks). This embodiment increases the flexibility of the encoding method.

According to some embodiments, an initial frame of the sequence of frames is encoded as an intra-frame encoded reference frame, and one or more frames immediately following the initial frame in the sequence of frames are encoded as inter-frame encoded reference frames.

According to some embodiments, the encoded reference frames comprise at least two inter-frame encoded frames. Advantageously, this may reduce noticeable repeating of noise in the empty frames, and thus result in a more realistic noise in the empty frames.

According to some embodiments, the step of selecting an encoded reference frame is performed using a random function. Advantageously, this reduces the complexity of the encoding method since the encoder may not need to store any predetermined selection sequence for the step of selection of reference frames. Moreover, the number of reference frames are irrelevant, since such a random function will inherently choose among the available reference frames in a random manner.

According some embodiments, the step of selecting an encoded reference frame is performed according to a predetermined selection sequence. Such sequence may be stored in the encoder as a table or similar. In this case, there may exist one such sequence for each number of available reference frames. In other embodiments, the predetermined selection sequence is in the form of an algorithm, for example, a modulo operation.

According to some embodiments, the step of encoding a frame as an empty frame comprises: selecting a temporally preceding encoded reference frame among the encoded reference frames. In other words, the empty frame can be compared to an P-frame. Alternatively, or additionally, the encoded reference frame may be a temporally following frame, c.f. a B-frame.

According to a second aspect of the present teachings, the above object is achieved by a computer program product comprising a computer-readable storage medium with instructions adapted to carry out the method of the first aspect when executed by a device having processing capability.

According to a third aspect of the present teachings, the above object is achieved by a device adapted for encoding a sequence of frames in a video stream, the device comprising a processor configured to: determine a motion level of image data of an initial frame in the sequence of frames to be below a motion level threshold; encode a plurality of reference frames, each reference frame of the plurality of encoded reference frames being an intra-frame encoded frame or an inter-frame encoded frame; and encode a plurality of empty frames, wherein an empty frame comprises macroblocks encoded as skip blocks and a reference to another frame in the video stream, by, for each frame to be encoded as an empty frame: select an encoded reference frame among the encoded reference frames; encode the empty frame having a direct or indirect reference to the selected reference frame; wherein for at least one pair of consecutive empty frames in the encoded sequence of frames, the reference frame selected for a first empty frame in the pair differs from the reference frame selected for a second empty frame in the pair.

According to a fourth aspect of the present teachings, the above object is achieved by a first device for continuously capturing data of a scene, and producing a video stream comprising a sequence of frames based on the captured data; a second device adapted to determine a motion level for each frame of the video stream; and a third device according to the third aspect, adapted to receive the sequence of frames and the determined motion levels for the sequence of frames.

According to some embodiments, the first, second and third devices are implemented in an image capturing device, for example, a video camera. In other embodiments, the first device is the image capturing device, and the second device is a separately arranged video analytics unit, and the third device is a separately arranged video encoder unit.

The second, third and fourth aspects may generally have the same features and advantages as the first aspect. It is further noted that the present teachings relate to all possible combinations of features unless explicitly stated otherwise.

BRIEF DESCRIPTION OF THE DRAWINGS

The above, as well as additional objects, features and advantages of the present teachings, will be better understood through the following illustrative and non-limiting detailed description of embodiments, with reference to the appended drawings, where the same reference numerals will be used for similar elements, wherein.

DETAILED DESCRIPTION

The present teachings will now be described more fully hereinafter with reference to the accompanying drawings, in which embodiments of the present teachings are shown. The systems and devices disclosed herein will be described during operation.

Figure 1:
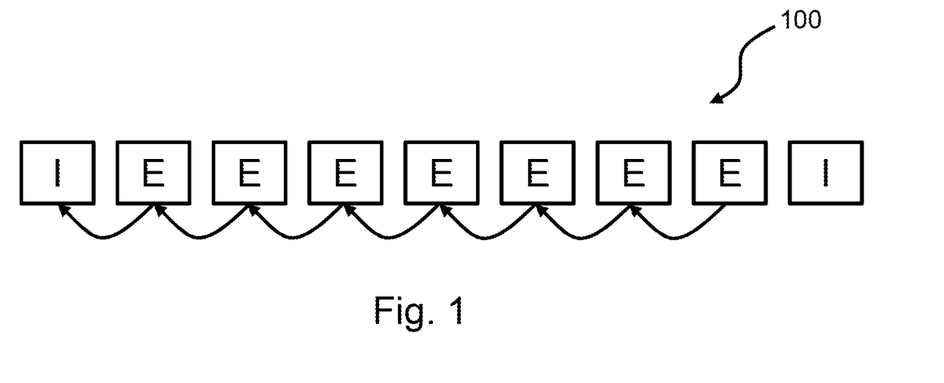
FIG. 1 shows a known method of encoding a sequence of frames in which a low amount of motion is determined.

FIG. 1 shows a method of encoding a sequence of frames according to prior art. As described above, during time periods when there is no or a limited amount of motion in the scene being captured, one way of saving bandwidth (reducing or optimizing the bit rate of the encoded frame sequence) may be to encode some of the frames as empty frames, that is encoded with at least some empty blocks (skip blocks, P-skip blocks etc.). These frames are hereinafter referred to with an "E" in the figures. In FIG. 1, the first frame in the sequence of frames 100 is encoded as an I-frame (denoted with an "I" in the figures), and the remaining frames 100 are encoded as empty frames with a reference to the immediately preceding frame in the sequence of frames 100 and thus all having a direct or indirect reference to the I-frame. This will have the effect that there is very little (or no) temporal noise in the video, since all frames 100 will be displayed as a copy of the first frame (that is the I-frame). Thus, a user watching the video resulting from the frames 100 will find that it looks unnatural and frozen, and the user could start wondering if there is a hardware or software malfunction with the camera. This suspicion may even force the user to physically inspect the camera which takes up valuable time and can be difficult if the camera is installed in a difficult accessible place.

Even if a scene is completely still (e.g., an empty train station at night), temporal noise in a sequence of captured frames will still exist due to noise at the image sensor. This inherent noise level in the captured image data may be taken advantage of when encoding the frames. In the following, several examples of how to encode a sequence of frames will be described. However, they all have at least two characteristics in common. Firstly, a plurality of reference frames are encoded, which may be referred to by the encoded empty frames. These reference frames are encoded in a normal way, for example, an I-frame followed by at least one P-frame referring to the I-frame (or to another P-frame in the case of a plurality of P-frames), wherein the reference frames are advantageously encoded without any skip blocks, or at least with a minority of skip blocks. Secondly, for at least one pair of consecutive empty frames in the encoded sequence of frames, the reference frame for a first empty frame in the pair differs from the reference frame for a second empty frame in the pair. By encoding in this way, the inherent temporal noise when capturing the scene will be present in the plurality of reference frames, and by not choosing the same reference frame for a first empty frame as for an immediately following second empty frame in the encoded sequence of frames, this temporal noise will be present also in this pair of consecutive encoded empty frames.

Figure 2:
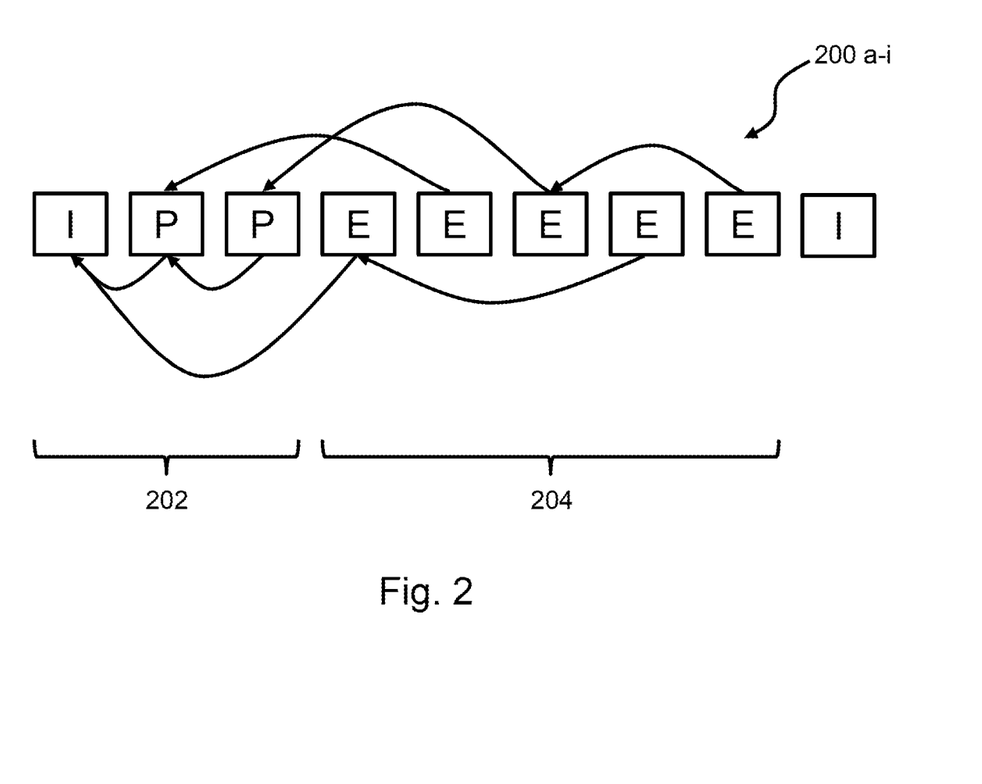
FIG. 2 shows a method of encoding a sequence of frames in which a low amount of motion is determined according to a first embodiment.
Figure 3:
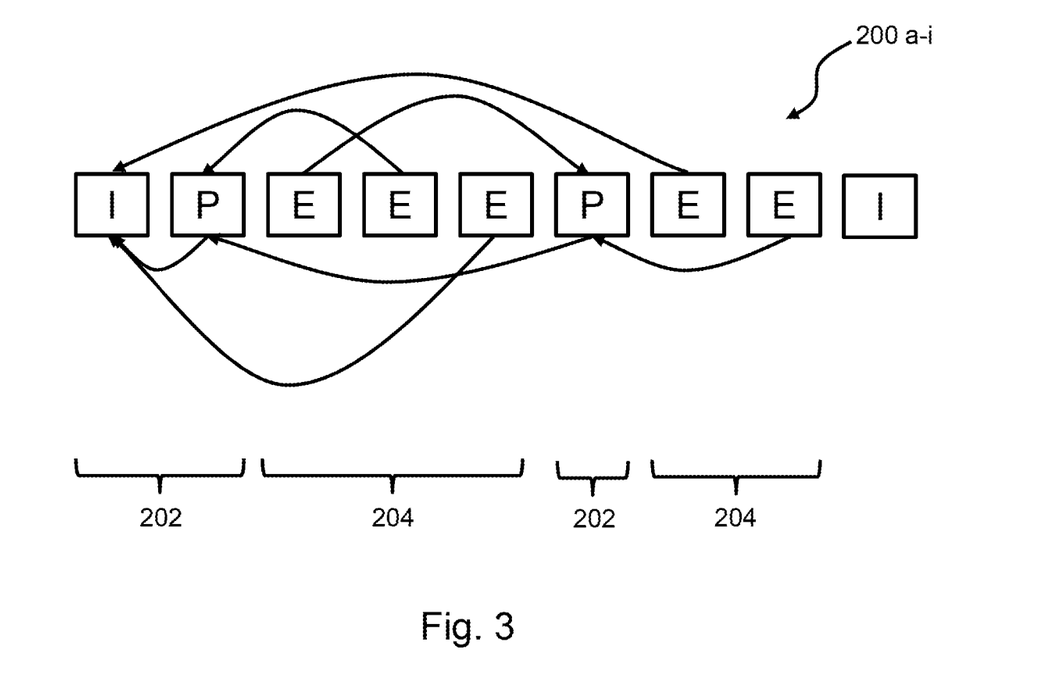
FIG. 3 shows a method of encoding a sequence of frames in which a low amount of motion is determined according to a second embodiment.
Figure 4:
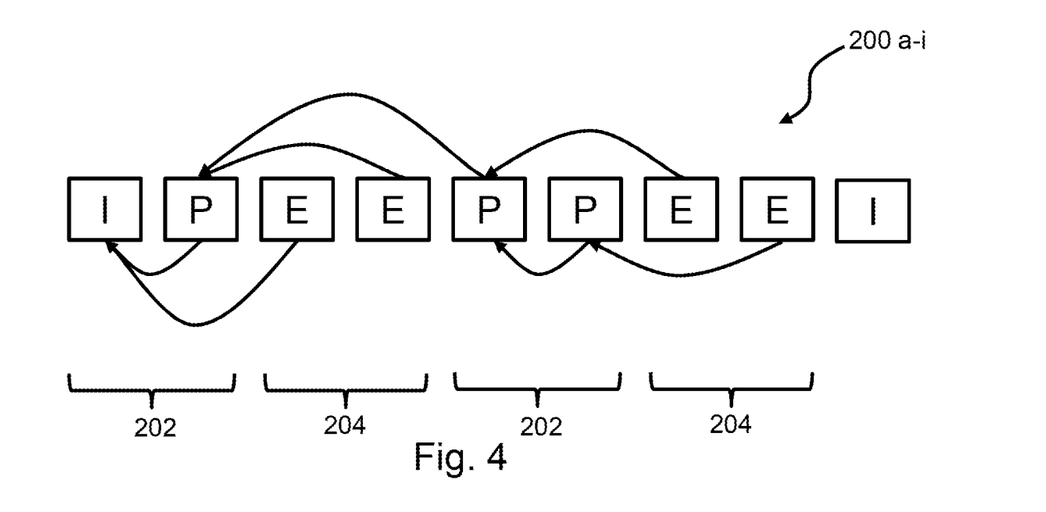
FIG. 4 shows a method of encoding a sequence of frames in which a low amount of motion is determined according to a second embodiment.

FIGS. 2-4 show by way of example a method of encoding a sequence of frames, for which a low amount of motion is determined. In these examples, the encoded frames correspond to a group of pictures (GOP), however, this is not a requirement for the present teachings. The methods disclosed herein may be used for any sequence of frames such as half a GOP or similar.

FIG. 2 shows by way of example a method of encoding a sequence of frames according to a first embodiment. A plurality of reference frames 202 is encoded, which in this case corresponds to that an initial frame 200a of the sequence of frames 200 is encoded as an intra-frame encoded reference frame ("I" in the figures), wherein two frames 200b-c immediately following the initial frame 200a in the sequence of frames 200 are encoded as inter-frame encoded reference frames ("P" in the figures). According to other embodiments, more than one frame in the plurality of reference frames 202 is encoded as an I-frame. The inter-frame encoded reference frames may be in the form of P-frames and/or B-frames. The number of reference frames 202 (leading to an increased bit rate of the encoded sequence of frames 200) should be balanced with the improved level of user experience. For example, a larger GOP may result in that more reference frames 202 are encoded compared to a smaller GOP. In FIG. 2, the remaining frames 200d-h in the GOP (the last encoded frame 200i refers to the initial frame of the following GOP) are encoded as empty frames 204. For each empty frame 204, an encoded reference frame 202 is selected and referred to (depicted in the FIGS. 2-4 as arrows). As can be seen in FIG. 2, for each pair of consecutive empty frames 204 in the encoded sequence of frames 200, the selected reference frame for a first empty frame in the pair differs from the selected reference frame for a second empty frame in the pair. For example, the first empty frame 200d in FIG. 2 refers to the first reference frame 200a, while for the immediately following empty frame 200e, the selected reference frame is the second reference frame 200b. For these two empty frames 200d-e, the frames are encoded with a direct reference to the selected reference frames 200a-b. This is also the case for the following empty frame 200f, which directly refer to the third reference frame 200c. For the next empty frame 200g (the $4^{th}$ empty frame in the example of FIG. 2), this frame is referring to the first empty frame 200d, which in turn refers to the first reference frame 200a. The $4^{th}$ empty frame thus comprises an indirect reference to a reference frame, that is via another empty frame 200d. In other words, the encoding of the $4^{th}$ empty frame 200g comprises selecting an encoded reference frame 200a among the encoded reference frames 202, wherein the selected encoded reference frame already is directly referred to by another encoded empty frame 200d. This indirect way of referring may reduce the number of frames that the encoded needs to store in memory when encoding. For the last ($5^{th}$) empty frame 200h in this example, the selected reference frame is the third reference frame 200c, which is referred to by the $5^{th}$ empty frame 200h in an indirect way, via the $3^{rd}$ empty frame 200f. The five empty frames 200d-h thus refer to, in temporal order, reference frame 1-2-3-1-3. In other words, for each pair of consecutive empty frames in the encoded sequence of frames 200, the selected reference frame for a first empty frame in the pair differs from the selected reference frame for a second empty frame in the pair. In this way, temporal noise will be introduced among each of the empty frames, thus providing a "comforting" noise for a user (e.g., an operator) which looks at the displayed decoded frames. It may also be noted that in the exemplary embodiment shown in FIG. 2, for the first frame 200d to be encoded as an empty frame 204, which is immediately subsequent to a specific encoded reference frame 200c among the plurality of reference frames 202 in the sequence of frames 200, the step of selecting an encoded reference frame among the plurality of encoded reference frames 202 comprises selecting an encoded reference 200a among the plurality of encoded reference frames 202 being different from the specific encoded reference frame 200c. In this way, temporal noise will be introduced also between the first frame 200d to be encoded as an empty frame 204 and the reference frame 200c immediately preceding said empty frame 200d. In other embodiments, the frame 200d may reference the frame 200c.

In the example of FIG. 2, only the initial frames in the sequence of frames are encoded as reference frames 202. This is only by way of example. In FIG. 3, the two first frames 200a-b are encoded as reference frames 202. Three following frames 200c-e are encoded as empty frames 204. A further, subsequent, frame 200f is encoded as a reference frame followed by two more frames 200g-h that are encoded as empty frames 204. This way of introducing reference frame(s) later in the sequence of frames may be advantageous in order to capture changes in the scene that may have taken place during capturing of the sequence of frames 200. A further difference from the example of FIG. 2 is that one of the empty frames refers to a temporally later reference frame, by that the first empty frame 200c refers to the $3^{rd}$ reference frame 200f. Since many standards allow inter-frame encoded frames to refer in a forward direction (e.g., a B-frame, Bidirectional predicted picture) this may also be allowed for the empty frames of the present teachings (which have the form of an inter-frame encoded frames which comprises macroblocks encoded as skip blocks).

In FIG. 4, only temporally preceding encoded reference frames among the encoded reference frames are referred to by the empty frames, even though the sequence of frames 200 comprises two separate sets of reference frames 202. By only selecting a temporally preceding encoded reference frame when encoding empty frames 204, the number of frames that needs to be stored in memory of the encoder is reduced, and the method of encoding a sequence of frames is simplified.

Figure 5:
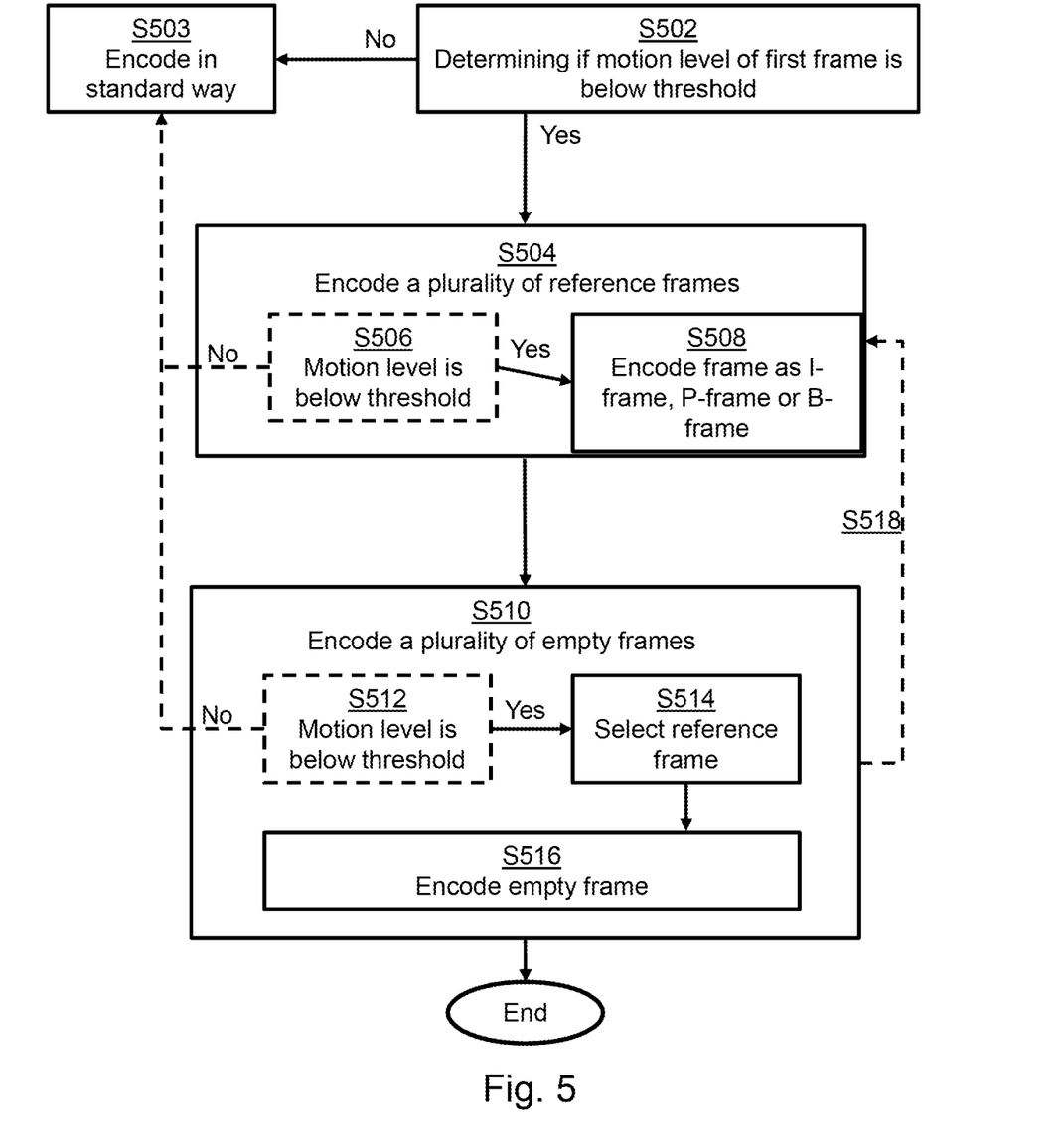
FIG. 5 shows a flow chart of encoding a sequence of frames according to some embodiments.

FIG. 5 shows a flow chart of encoding a sequence of frames according to some embodiments. To determine if empty frames should be employed at all for a sequence of frames, it is determined S502 if a motion level of image data of an initial frame in the sequence of frames is below a motion level threshold. The motion level of the initial frame may be determined based on a comparison with one or more preceding frames, for example, a preceding GOP etc. For example, an average motion level for preceding sequences motion level may be received by the encoder from a separate motion level calculating unit or be calculated at the encoder. The motion level threshold may be predetermined, based on the frames, or a user adjustable value that, for example, an operator can set based on the use case. As described above, the initial frame may or may not correspond to a first frame of a GOP. If it is determined that the motion level exceeds the motion level threshold, it may be determined that the following sequence of frames should be encoded S503 in a conventional way (standard way), for example, using intra-frame encoded frames and inter-frame encoded frames without empty frames as defined in the present disclosure. However, if it is determined that the motion level of the initial frame is below the threshold motion level, it may be determined that it is likely that the following sequence of frames comprises none or low amount of motion and thus the encoding method of the present disclosure may be advantageously used to optimize bit rate. Using the method may be particularly advantageous when capturing video of a scene comprising low amounts of light. In these cases, the amount of inter-frame noise will be high, and would, if encoded as P-frames in a conventional way, result in much residual values (differences to the reference frame) that needs to be encoded.

Then, a plurality of reference frames is encoded S504. Optionally, before encoding a reference frame, the motion level of the image data of the frame to be encoded as a reference frame may be compared S506 to the motion level threshold. By doing this continuously, the method may be aborted at any time to return to normal encoding S503. By not checking S506 the motion level at this stage, processing power required for the encoding process may be reduced. Each reference frame is encoded S508 as an intra-frame encoded frame or an inter-frame encoded frame.

According to some embodiments, all motion vectors of the inter-frame encoded frames are set to zero. Since it is likely (or determined S506) that the image content of the reference frames contains very little or no motion compared to earlier frames, this can be taken advantage of by not performing a block matching to encode the macro blocks of the inter-frame encoded frames but instead just refer to the same blocks in a preceding frame. Consequently, processing power may be saved, and a higher QP value may be used for the encoding to further increase the saving in bit rate.

Then, a plurality of empty frames is encoded S510. Optionally, prior to encoding a frame as an empty frame, a motion level for the image data of said frame is received or otherwise determined and compared to the motion level threshold. In this embodiment, it is determined S512 whether the motion level is below the motion level threshold. Upon determining that the motion level is above the threshold motion level, the method may be aborted, and standard encoding S503 follows. In other words, the current frame is encoded as an inter-frame encoded frame or an intra-frame encoded frame in a conventional way. However, upon determining that the motion level is below the threshold motion level, the frame is encoded as an empty frame. This includes selecting S514 an encoded reference frame among the plurality of encoded reference frames. This selection process may be performed using different strategies.

According to one embodiment, the step of selecting an encoded reference frame is performed using a random function. The random function may take the number of available reference frames as input (or indexes of the available reference frames in the sequence of frames), as well as, for example, an index of any not allowed reference frame. A not allowed reference frame may be the reference frame used as reference for an immediately preceding empty frame in the sequence of frames, to avoid that two immediately following empty frames will refer to the same reference image.

According to one embodiment, the step of selecting an encoded reference frame is performed according to a predetermined selection sequence. For example, the encoder may know such selection sequences for each number of possible reference images, for example, in the form of one list for the case of two reference images, one list for the case of three (e.g., 1, 2, 3, 1, 2, 3, 1, 2, 3, . . . ), one list for the case of four, etc. The predetermined selection sequence may be in the form of an algorithm, for example, a modulo operation. Such algorithm may look have the form of $$I=X \bmod Y,$$

where Y is the number of available reference images, and X is the index of the current frame to be encoded as an empty frame in the sequence of frames. The result of the modulo operation (I) in will then be used to select the index of the reference image which the empty frame will refer to.

When the encoded reference frame has been selected, the empty frame is then encoded S516 with a direct or indirect reference to the selected reference frame.

Optionally, after encoding one or more empty frames, new reference frames may be encoded S504 (the method thus iterate S518), followed by encoding S516 a set of encoded empty frames etc., until the complete sequence of frames has been encoded. In other embodiments, all remaining frames in the sequence of frames are encoded as empty frames.

The encoding methods as described herein will follow standards such as H.264 and H.265. In other words, a standard decoder may be used for decoding.

Figure 6:
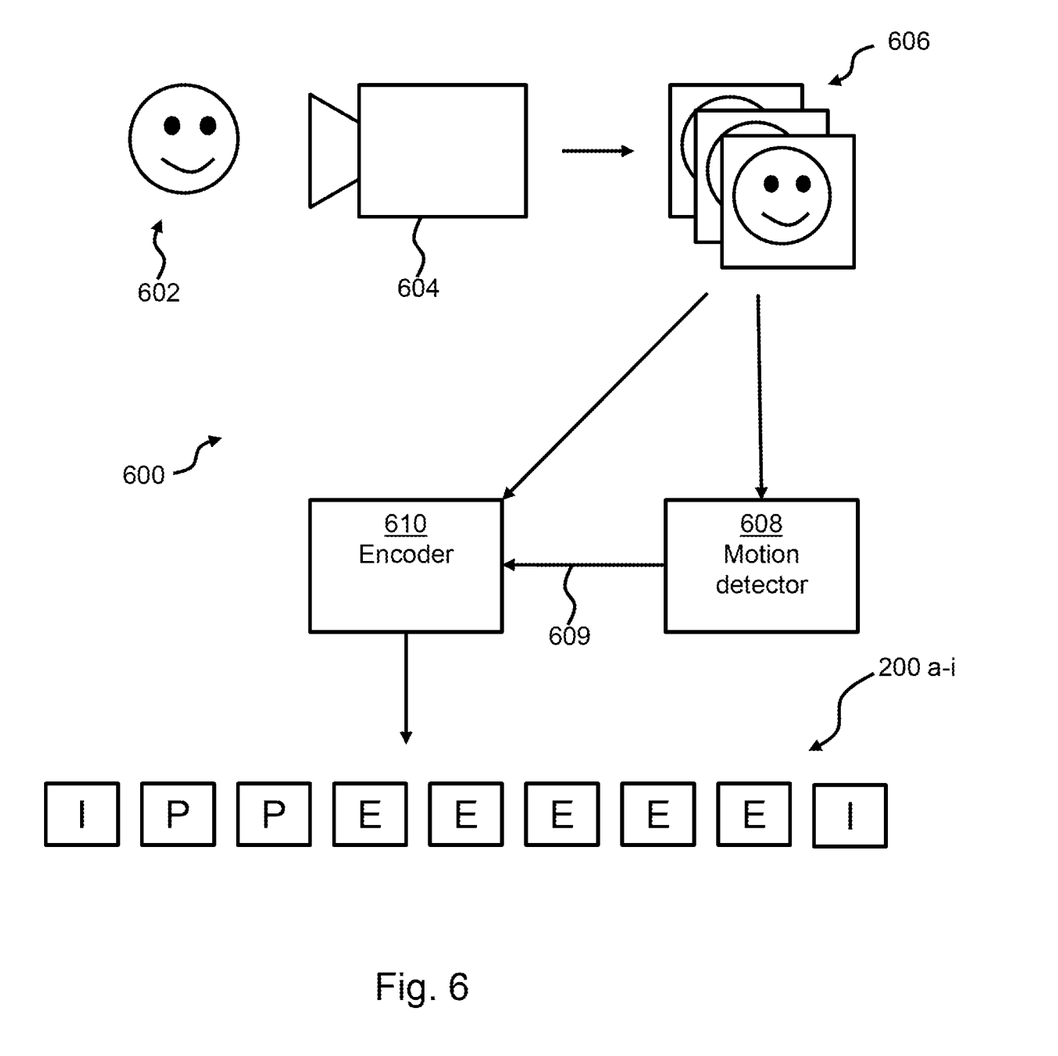
FIG. 6 shows a system adapted to capture data of a scene, determine a motion level of the content of the scene, and encode a sequence of frames depicting the scene.

FIG. 6 shows a system 600 for capturing and encoding a sequence of frames according to the present teachings. The system 600 comprises a first device 604 (that is a video camera) for continuously capturing image data of a scene 602 and producing a video stream comprising a sequence of image frames 606 based on the captured image data. The system 600 further comprises a motion detector unit 608 adapted to determine a motion level 609 for each frame of the video stream. The motion detector unit 608 may (using, for example, a processor) calculate a motion level for a frame using any known motion detection and/or object tracking algorithm.

The sequence of frames 606 and the determined motion levels 609 are sent to a third device (encoder) 610 which is adapted for encoding a sequence of frames as described above. In FIG. 6, the video capturing first device 604, the motion detector unit (second device) 608 and the encoding third device 610 are depicted as separate units. However, according to some embodiments, all three devices 604, 608, 610 are implemented in a common image capturing device.

In the above the inventive concept has mainly been described with reference to a limited number of examples. However, as is readily appreciated by a person skilled in the art, other examples than the ones disclosed above are equally possible within the scope of the inventive concept, as defined by the appended claims.

What is claimed is:

1. A method of encoding a sequence of frames in a video stream by an encoder, the sequence of frames being in an order corresponding to a capturing time of the sequence of frames, wherein, upon determining that a motion level of image data of an initial frame in the sequence of frames is below a motion level threshold, the method comprising:

encoding first frames among the sequence of frames as a plurality of reference frames, each reference frame of the plurality of encoded reference frames being an intra-frame encoded frame or an inter-frame encoded frame and corresponding to a frame among the sequence of frames; and encoding second frames among the sequence of frames as a plurality of empty frames, each corresponding to a frame among the sequence of frames, wherein an empty frame comprises macroblocks encoded as skip blocks and a reference to another frame in the video stream, by, for each frame of the second frames among the sequence of frames to be encoded as an empty frame:
    selecting an encoded reference frame among the plurality of encoded reference frames; and
    encoding the frame of the second frames among the sequence of frames as an empty frame having a direct or indirect reference to the selected reference frame, wherein an indirect reference is made via a previously encoded empty frame which refers to the selected reference frame;
wherein for at least one pair of consecutive empty frames in the encoded sequence of frames, the selected reference frame for a first empty frame in the pair differs from the selected reference frame for a second empty frame in the pair,
wherein the frame among the sequence of frames corresponding to the selected reference frame for the first empty frame and the frame among the sequence of frames corresponding to the selected reference frame for the second empty frame both are temporally preceding to the frames among the sequence of frames corresponding to the first and second empty frames in the sequence of frames.

2. The method of claim 1, wherein for each pair of consecutive empty frames in the encoded sequence of frames, the selected reference frame for a first empty frame in the pair differs from the selected reference frame for a second empty frame in the pair.

3. The method of claim 1, wherein for a first frame among the sequence of frames to be encoded as an empty frame, said first frame being immediately subsequent to the frame among the sequence of frames corresponding to a first encoded reference frame among the plurality of reference frames in the sequence of frames, the step of selecting an encoded reference frame among the plurality of encoded reference frames comprises selecting an encoded reference frame among the plurality of encoded reference frames being different from said first encoded reference frame.

4. The method of claim 1, wherein the plurality of reference frames comprises one or more inter-frame encoded frames, wherein the method further comprises:
    setting all motion vectors of the one or more inter-frame encoded frames to zero.

5. The method of claim 1, wherein for at least one empty frame, the encoding of the frame of the second frames among the sequence of frames as the empty frame comprises:
    selecting an encoded reference frame among the encoded reference frames, wherein the selected encoded reference frame already is directly referred to by another encoded empty frame; and
    encoding the frame of the second frames among the sequence of frames as the empty frame having a reference to said another encoded empty frame.

6. The method of claim 1, wherein an encoded empty frame has the form of an inter-frame encoded frame in which all macroblocks are set to skip blocks.

7. The method of claim 1, further comprising:
prior to encoding a frame of the sequence of frames as an empty frame, receiving a motion level for the image data of said empty frame, and determining whether the motion level is below the motion level threshold;
upon determining that the motion level is below the threshold motion level, encoding the frame as an empty frame; and
upon determining that the motion level is above the threshold motion level, encoding the frame as an inter-frame encoded frame or an intra-frame encoded frame.

8. The method of claim 1, wherein an initial frame of the sequence of frames is encoded as an intra-frame encoded reference frame, wherein one or more frames immediately following the initial frame in the sequence of frames are encoded as inter-frame encoded reference frames.

9. The method of claim 1, wherein the encoded reference frames comprise at least two inter-frame encoded frames.

10. The method of claim 1, wherein the selecting an encoded reference frame is performed using a random function or performed according to a predetermined selection sequence.

11. The method of claim 1, wherein the encoding a frame as an empty frame comprises:
    selecting an encoded reference frame among the encoded reference frames corresponding to a temporally preceding frame among the sequence of frames.

12. A computer program product comprising a non-transitory computer readable storage medium including instructions, which when executed by a device having a processing capability, cause the device to execute instructions to perform operations for encoding a sequence of frames in a video stream being in an order corresponding to a capturing time of the sequence of frames, wherein, upon determining that a motion level of image data of an initial frame in the sequence of frames is below a motion level threshold comprising:
    encoding first frames among the sequence of frames as a plurality of reference frames, each reference frame of the plurality of encoded reference frames being an intra-frame encoded frame or an inter-frame encoded frame and corresponding to a frame among the sequence of frames; and
    encoding second frames among the sequence of frames as a plurality of empty frames, each corresponding to a frame among the sequence of frames, wherein an empty frame comprises macroblocks encoded as skip blocks and a reference to another frame in the video stream, by, for each frame of the second frames among the sequence of frames to be encoded as an empty frame:
        selecting an encoded reference frame among the plurality of encoded reference frames; and
        encoding the frame of the second frames among the sequence of frames as an empty frame having a direct or indirect reference to the selected reference frame, wherein an indirect reference is made via a previously encoded empty frame which refers to the selected reference frame;
    wherein for at least one pair of consecutive empty frames in the encoded sequence of frames, the selected reference frame for a first empty frame in the pair differs from the selected reference frame for a second empty frame in the pair,
    wherein the frame among the sequence of frames corresponding to the selected reference frame for the first empty frame and the frame among the sequence of frames corresponding to the selected reference frame for the second empty frame both are temporally preceding to the frames among the sequence of frames corresponding to the first and second empty frames in the sequence of frames.

13. A device for encoding a sequence of frames in a video stream being in an order corresponding to a capturing time of the sequence of frames, the device comprising a processor, wherein upon determining, by the processor, that a motion level of image data of an initial frame in the sequence of frames is below a motion level threshold, the processor being configured to:
　　encode first frames among the sequence of frames as a plurality of reference frames, each reference frame of the plurality of encoded reference frames being an intra-frame encoded frame or an inter-frame encoded frame and corresponding to a frame among the sequence of frames; and
　　encode second frames among the sequence of frames as a plurality of empty frames, each corresponding to a frame among the sequence of frames, wherein an empty frame comprises macroblocks encoded as skip blocks and a reference to another frame in the video stream, by, for each frame of the second frames among the sequence of frames to be encoded as an empty frame:
　　　　select an encoded reference frame among the encoded reference frames; and
　　　　encode the frame of the second frames among the sequence of frames as an empty frame having a direct or indirect reference to the selected reference frame, wherein an indirect reference is made via a previously encoded empty frame which refers to the selected reference frame;
　　wherein for at least one pair of consecutive empty frames in the encoded sequence of frames, the reference frame selected for a first empty frame in the pair differs from the reference frame selected for a second empty frame in the pair,
　　wherein the frame among the sequence of frames corresponding to the selected reference frame for the first empty frame and the frame among the sequence of frames corresponding to the selected reference frame for the second empty frame both are temporally preceding to the frames among the sequence of frames corresponding to the first and second empty frames in the sequence of frames.

14. A system comprising:
　　a first device for continuously capturing data of a scene, and producing a video stream comprising a sequence of frames based on the captured data, the video stream being in an order corresponding to a capturing time of the sequence of frames;
　　a second device configured to determine a motion level for each frame of the video stream; and
　　a third device configured to receive the sequence of frames and the determined motion levels for the sequence of frames,
　　wherein the third device comprises a processor configured to, upon determining that a motion level of image data of an initial frame in the sequence of frames is below a motion level threshold:
　　　　encode first frames among the sequence of frames as a plurality of reference frames, each reference frame of the plurality of encoded reference frames being an intra-frame encoded frame or an inter-frame encoded frame and corresponding to a frame among the sequence of frames; and
　　　　encode second frames among the sequence of frames as a plurality of empty frames, each corresponding to a frame among the sequence of frames, wherein an empty frame comprises macroblocks encoded as skip blocks and a reference to another frame in the video stream, by, for each frame of the second frames among the sequence of frames to be encoded as an empty frame:
　　　　　　select an encoded reference frame among the encoded reference frames; and
　　　　　　encode the frame of the second frames among the sequence of frames as an empty frame having a direct or indirect reference to the selected reference frame, wherein an indirect reference is made via a previously encoded empty frame which refers to the selected reference frame;
　　　　wherein for at least one pair of consecutive empty frames in the encoded sequence of frames, the reference frame selected for a first empty frame in the pair differs from the reference frame selected for a second empty frame in the pair,
　　　　wherein the frame among the sequence of frames corresponding to the selected reference frame for the first empty frame and the frame among the sequence of frames corresponding to the selected reference frame for the second empty frame both are temporally preceding to the frames among the sequence of frames corresponding to the first and second empty frames in the sequence of frames.

15. The system according to claim 14, wherein the first, second and third devices are implemented in an image capturing device.

* * * * *